United States Patent
Dokko

(10) Patent No.: US 7,043,245 B2
(45) Date of Patent: May 9, 2006

(54) CALL PROCESSING METHOD DURING TERMINATION BUSY STATE OF TERMINAL IN RADIO INTELLIGENT NETWORK SYSTEM

(75) Inventor: Sehjoon Dokko, Seoul (KR)

(73) Assignee: LG Electronics Inc., Seoul (KR)

( * ) Notice: Subject to any disclaimer, the term of this patent is extended or adjusted under 35 U.S.C. 154(b) by 479 days.

(21) Appl. No.: 10/015,644

(22) Filed: Dec. 17, 2001

(65) Prior Publication Data

US 2002/0077101 A1     Jun. 20, 2002

(30) Foreign Application Priority Data

Dec. 16, 2000 (KR) ............... 2000-77507

(51) Int. Cl.
*H04Q 7/20* (2006.01)
*H04M 3/42* (2006.01)
*H04M 3/00* (2006.01)

(52) U.S. Cl. .......... 455/445; 455/461; 455/414.1; 455/528; 379/265.11; 379/207.02

(58) Field of Classification Search ........ 455/404.2, 455/433, 528, 414, 63.3, 550, 560, 445, 417, 455/414.1; 370/350, 58, 209.1, 207.2, 210.1, 370/63, 201; 379/230, 219, 221.08
See application file for complete search history.

(56) References Cited

U.S. PATENT DOCUMENTS

| | | | | |
|---|---|---|---|---|
| 5,271,058 A * | 12/1993 | Andrews et al. | ....... | 379/265.11 |
| 5,544,224 A * | 8/1996 | Jonsson et al. | ............. | 455/434 |
| 5,566,236 A * | 10/1996 | MeLampy et al. | ..... | 379/210.01 |
| 5,822,419 A * | 10/1998 | Enstone et al. | ........ | 379/201.03 |
| 5,878,128 A * | 3/1999 | Kantola | ...................... | 379/230 |
| 5,943,334 A * | 8/1999 | Buskens et al. | ............ | 370/350 |
| 5,963,630 A * | 10/1999 | Dabbs et al. | ........... | 379/201.01 |
| 5,991,541 A * | 11/1999 | Ozalp | ......................... | 717/164 |
| 5,995,848 A * | 11/1999 | Nguyen | ..................... | 455/528 |
| 6,154,644 A * | 11/2000 | Murray | .................... | 455/414.1 |
| 6,167,064 A * | 12/2000 | Cohn et al. | ................. | 370/522 |
| 6,219,551 B1 * | 4/2001 | Hentila et al. | .............. | 455/445 |
| 6,223,051 B1 * | 4/2001 | Rikihisa | ..................... | 455/564 |
| 6,339,640 B1 * | 1/2002 | Chen et al. | ............ | 379/209.01 |
| 6,473,615 B1 * | 10/2002 | Theppasandra et al. | ..... | 455/445 |
| 6,477,364 B1 * | 11/2002 | Otake | ...................... | 455/414.1 |
| 6,487,288 B1 * | 11/2002 | Tuunanen | ................... | 379/230 |
| 6,526,134 B1 * | 2/2003 | Wallenius | .............. | 379/201.01 |
| 6,614,896 B1 * | 9/2003 | Rao | ....................... | 379/209.01 |
| 6,661,887 B1 * | 12/2003 | Wallenius | ................... | 379/219 |
| 6,760,425 B1 * | 7/2004 | Tuunanen | ................... | 379/221.08 |
| 6,865,265 B1 * | 3/2005 | Eikkula et al. | ......... | 379/207.02 |
| 2002/0077091 A1 * | 6/2002 | Immonen et al. | ........... | 455/417 |

* cited by examiner

*Primary Examiner*—William Trost
*Assistant Examiner*—Kiet Doan
(74) *Attorney, Agent, or Firm*—Fleshner & Kim, LLP

(57) ABSTRACT

A call processing method during terminating BUSY states (busy, power down, and paging failure) of a terminal in a radio intelligent network system. The method includes detecting the terminating BUSY state of the terminal from an HLR (Home Location Register); performing an OBUSY operation between a SCP and a T_Busy DP in a T_SSP when the terminating BUSY state is detected; generating an O_BCSM as a result of the operation; and re-attempting a call connect to a termination switch number transmitted to the generated O_BCSM.

26 Claims, 6 Drawing Sheets

BACKGROUND ART

CALL PROCESSING METHOD DURING TERMINATION BUSY STATE OF TERMINAL IN RADIO INTELLIGENT NETWORK SYSTEM

BACKGROUND OF THE INVENTION

1. Field of the Invention

The present invention relates to a radio intelligent network system, and particularly, to a call processing method when a terminal is in terminating BUSY states (busy, power down, and failure in paging) and in the terminal pause state.

2. Description of the Background Art

An earlier communication system is a system in which a person in front of an exchanger processes various customers requests. However, a mechanical exchanger had developed, and an electronic exchanger is commonly used in present communication system. The automation makes processing speed or capacity to be increased, however, it can not process the various requests of the customers actively.

In order to solve the above problems, an IN (Intelligent Network) has been developed. The IN is a structural concept for introducing a new service and providing a new function in an electric communication network. The IN increases the service introduction speed, extends a range of the service, and makes a plurality of producers be able to develop services independently. The IN can be applied to a PSTN (Public Switched Telephone Network), PSDN (Packet Switched Data Network), N-ISDN (Narrowband-Integrated Services Digital Network), and to B-ISDN (Broadband Integrated Services Digital Network), and supports various services including supplementary services. Also, the intelligent network uses information process techniques; and network resources, provides standardized communication between networks through the services and an independent interface, and provides a function which can integrate services by associating the functions of the networks to the service provider. In addition, the service subscriber can control the properties of the service related to the subscriber and to the user.

Generally, a WIN (Wireless Intelligent Network) standard comprising IS-771, PN4287, and PN4289 is used for embodying the intelligent network in the present mobile communication system. The call processes of the intelligent network suggested by the WIN standard include a call control function (hereinafter, referred to as CCF), and service switching function (hereinafter, referred to as SSF). The CCF is a functional module for a call connection and controlling function. In addition, the SSF is a module which performs a service exchanging function connected to the CCF, and makes the intelligent network service by control of a SCP (Service Control Point) to be made by providing an interaction function between the CCF and a service control function (hereinafter, referred to as SCF).

The call control and management in the intelligent network by the CCF/SSF is made on the basis of a BCSM (Basic Call State Model) in a SSP (Service Switching Point). The BCSM is divided into an O_BCSM and a T_BCSM, and shows a call process and state of half call unit.

FIG. 1 is a flow chart of a signal process showing the conventional intelligent network for processing a call in a termination busy state when the terminal is in the terminating BUSY states (busy, power down, and failure in paging) in a wired network.

As shown therein, the intelligent network system in the wired network includes an SSP on originated side (O_SSP) 100, an HLR (Home Location Register) 200, an SCP (Service Control Point) 300, and an SSP on a terminated side (T_SSP) 400. Also, the O_SSP includes an O_BCSM 110 and a T_BCSM 120, and the T_SSP 400 includes a VLR (Visitor Location Register) 410, an O_BCSM 420, and T_BCSM 430.

When a mobile terminal on originated side tries to call connect to a terminal of mobile communication subscriber, an Analyzed Information PIC (Point In Call) 111 of the O_SSP 100 detects the origination of the terminal of the mobile subscriber on the terminated side and transmits a location request signal to the HLR 200 (S100). The HLR 200 receives the location information request signal and transmits a route request signal to the VLR 410 of the T_SSP 400 (S110), and the VLR 410 transmits the route signal to the HLR 200 (S120). Therefore, the HLR 200 detects that the mobile terminal on the terminated side is in a termination busy state through the route signal, and transmits a response signal for the location information signal including information about the termination busy state of the mobile terminal on the terminated side (busy, power down, and paging failure) and T-BUSY trigger information for processing the termination BUSY state to the O_BCSM 110 (S130). The T_BUSY trigger information is detected on an O_Called_Party_Busy 123 of the T_BCSM 120.

The O_BCSM 110 receives the T_BUSY trigger information translates a Select_Route PIC 112 for selecting a switch or a trunk needed to call connect, an Auth Call_Setup PIC 113 which judges the limited range of call connection, and a Send_Call PIC 114, and then, generates a T_BCSM 120 (S140). The generated T_BCSM 120 translates the call into an Auth_Term_Att PIC 121 and to a Select_Facility PIC 122, and the Select_Facility PIC 122 detects the termination BUSY state of the mobile terminal on the terminated side and the call is translated from the Select_Facility PIC 122 into the O_Called_Party_Busy 123. The O_Called_Party_Busy 123 notifies the SCP 300 of the termination BUSY state of the termination terminal, and performs a T_BUSY operation with the SCP 300 (S150). And as a result of the operation the O_BCSM 420 and T_BCSM 430 of the T_SSP 400 and T_BCSM 120 of the O_SSP 100 are released. In addition, a new T_BCSM 120 is generated in the O_SSP 100 (S160). The generated T_BCSM 120 in the O_SSP 100 generates an O_BCSM 110 in the O_SSP 100 (S170). The generated O_BCSM 110 receives a termination switching number from the SCP 300, and then identifies whether or not an automatic termination switching is set. If the automatic termination switching is set, the terminal attempts a call connection again. However if the automatic termination switching is not set, the terminal disconnects the call connection.

FIGS. 2 and 3 are flow charts of signal processes showing intelligent network systems for processing a call in a termination BUSY state of a terminal when the terminal is in a termination pause state in a wired network according to the conventional art.

FIG. 2 is showing an intelligent network system for processing a call in terminating BUSY state of a mobile terminal in case that the T_BCSM 120 of the O_SSP 100 performs TBUSY operation during the terminating BUSY state processing of the mobile terminal on terminated side in the wired network.

As shown therein, the processes of generating the T_BCSM 120 in the O_SSP 100 and translating it to the Select_Facility PIC 122 among the processes of call processing when the mobile terminal on terminated side is in a termination BUSY state are same as those in FIG. 1.

However, the HLR 200 in FIG. 1 is not in a termination BUSY state, but in a termination pause state when the HLR 200 transmits a location information signal to the O_BCSM 110 in the O_SSP 100. Therefore, the HLR 200 transmits a response signal to the location information signal to the O_BCSM 110 of the O_SSP 100, and at the same time, returns a TLDN (Temporary Local Directory Number) for setting a termination call.

It is not detected that the mobile terminal on the terminated side is in a termination BUSY state, and therefore the O_BCSM 110 of the O_SSP 100 switches the PIC from the Select_Facility PIC 122 of the O_SSP 100 into the Present_Call PIC 121, and the O_SSP 100 transmits a call setup signal to the T_SSP 400 (S200). The T_SSP 400 received the call setup signal generates O_BCSM 420 in order to process the call. The generated O_BCSM 420 of the T_SSP 400 translates the call to the Auth_Term_Att PIC 421, to a Collect_Info PIC 422, to an Analyzed_Info PIC 423, to a Select_Route PIC 424, to an Auth_Call Setup PIC 425, and to Send_Call PIC 426 in order, and generates T_BCSM 430 (S210). The generated T_BCSM 430 translates the call from an Auth_Term_Att PIC 431 to a Select_Facility PIC 432, and detects that the mobile terminal on terminated side is in termination BUSY state presently. The Select_Facility PIC 432 which detected the termination BUSY state of the mobile terminal transmits a REDREQ (Redirect Request) to the O_SSP 100 (S220). The T_BCSM 120 of the O_SSP 100 which received the REDREQ transmits a TBUSY operation performable response signal to the T_BCSM 430 of the T_SSP 400 (S230), and the call is translated from the T_BCSM 120 of the O_SSP 100 to a T_Busy DP (Detection Point) 123. The T_Busy DP 123 notifies the SCP 300 of the termination BUSY state of the mobile terminal (S240), and performs a TBUSY operation with the SCP 300 which received the termination BUSY state signal of the mobile terminal on terminated side. As a result of the TBUSY operation, the O_BCSM 420 and the T_BCSM 430 of the T_SSP 400 and the T_BCSM 120 of the O_SSP 100 are released, and the T_BCSM 120 of the O_SSP is generated (S250). The generated T_BCSM 120 in the O_SSP 100 generates a new OBCSM 110 (S260), and the generated O_BCSM 110 receives a termination switching number and identifies whether or not an automatic termination switch is set. If the automatic termination switch is set, the terminal attempt to call connect again. However, if the automatic termination switch is not set, the terminal disconnects the call connect.

FIG. 3 is showing an intelligent network system for call processing when the terminal is in termination BUSY state in the wired network in case that the T_BCSM 120 of the O_SSP 100 can not perform TBUSY operation according to the conventional art.

Processes of generating T_BCSM 120 in the O_SSP 100 and proceeding to the Select_Facility PIC 432 of the T_BCSM 430 among the steps of call processing when the mobile terminal is in termination BUSY state are same as those in FIG. 2, and therefore these are omitted in FIG. 3.

When a response for the REDREQ is a failure after the Select_Facility PIC 432 transmits the REDREQ to the T_BCSM 120 in the O_SSP 100, the call is translated from the Select_Facility PIC 432 to the T_Busy DP 431 of the T_BCSM 430 in the T_SSP 400 (S300 and S310). The T_Busy DP 431 detects the termination BUSY state of the mobile terminal on terminated side, and then the T_BCSM 430 in the T_SSP 400 notifies the SCP 300 of the termination BUSY state of the mobile terminal (S320). In addition, the T_BCSM 430 performs TBUSY operation with the SCP 300 which received the termination BUSY state of the mobile terminal (S330). As a result of the TBUSY operation, the O_BCSM 420 and the T_BCSM 430 in the T_SSP 400 and the T_BGSM 120 in the O_SSP 100 are disappeared, the T_BCSM 430 in the T_SSP 400 generates T_BCSM 120 of the O_SSP 100 (S340) A new O_BCSM 110 is generated on the Select_Facility PIC 124 (S350), and the generated O_BCSM 110 receives the termination switching number from the SCP 300 and then checks whether or not an automatic termination switch is set. If the automatic termination switch is set, the terminal attempts to call connect again. However, if the automatic termination switch is not set, the terminal disconnects the call connect.

Therefore, when the terminal on the terminated side is in a termination BUSY state, there should be four or more call processors (O_BCSM-T_BCSM-Trunk-O_BCSM-T_BCSM) which are generated by a mobile terminal on originated side and by the mobile terminal on a finally terminated side corresponding to the BCSM for call connecting between the two. As described above, in the conventional art, the switch, the trunk resources, and the process resources in the SSP are wasted in order to process the termination BUSY state, even though the termination BUSY state is already detected. Also, the function is lowered because the call processes are complex.

According to the conventional art, an unnecessary BCSM is generated and processed in order to operate the T_BUSY trigger, even though the mobile communication subscriber already detected the termination BUSY state. Therefore, the switch, trunk resources and the processor resources in the SSP are wasted in order to process the termination BUSY state of the mobile terminal on a terminated side, and the function is lowered because the call processes are complex. In more detail, according to the conventional art, the call process in the termination BUSY state should be performed by generating the T_BCSM of a terminating exchanger (not shown) and the trunk resources are wasted, because the conventional art has a same standard as that of a wired intelligent network.

SUMMARY OF THE INVENTION

Therefore, an object of the present invention is to provide a method for call processing in a termination BUSY state of a termination in a radio intelligent network system for perceiving the termination BUSY state (busy, power down, and paging failure) of the terminal and termination pause state, and for reducing call processors generated in order to process above states.

To achieve the object of the present invention as embodied and broadly described herein, there is provided a call processing method in a termination BUSY state of a terminal in a radio intelligent network system comprising: a step for perceiving the termination BUSY state of a terminal from a HLR (Home Location Register); a step for performing an origin BUSY (OBUSY) operation between a SCP (Service Control Point) and an origin SSP (Service Switching Point) if an origin BUSY state is detected; a step of generating an O_BCSM (Basic Call State Model) as a result of the operation; and a step of re-attempting call connect to a termination switching number which is transmitted to the generated O_BCSM.

The foregoing and other objects, features, aspects and advantages of the present invention will become more apparent from the following detailed description of the present invention when taken in conjunction with the accompanying drawings

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 4:
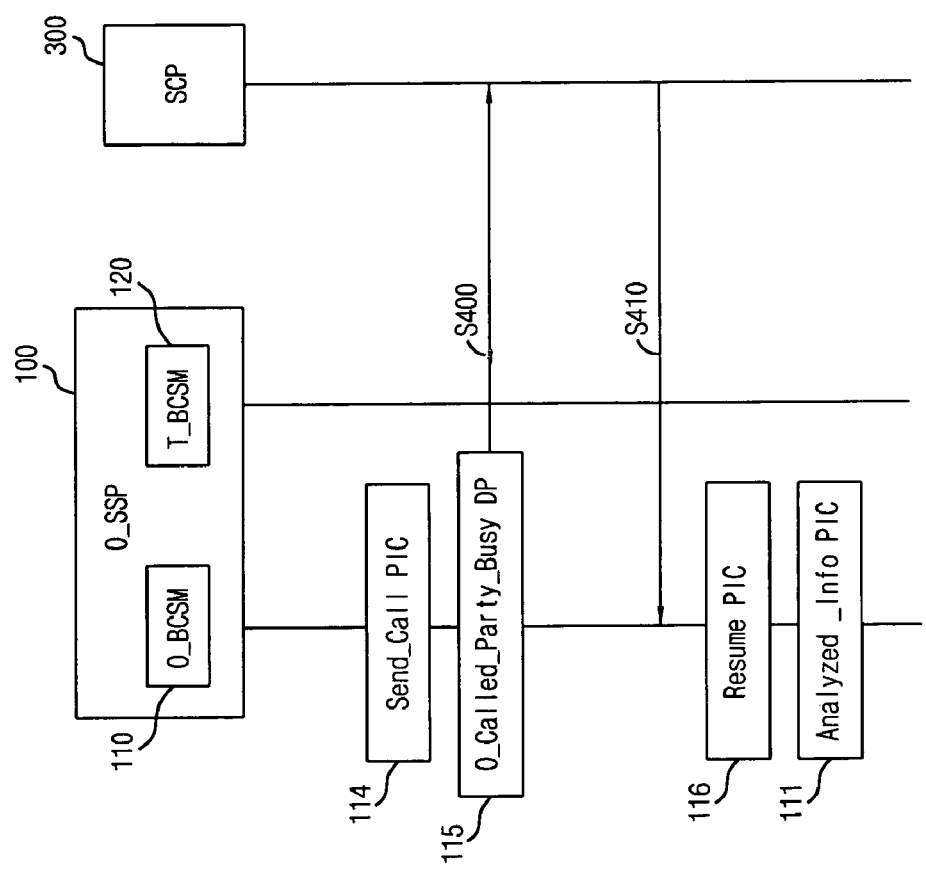
FIG. 4 is a flow chart of signal process showing a radio intelligent network system for processing a call of a termination BUSY state, when a terminal is in termination BUSY states (busy, power down, and paging failure) according to the present invention.

FIG. 4 is a flow chart of signal process showing a radio intelligent network system for processing a call in a termination BUSY state when a terminal is in termination BUSY states (busy, power down, and paging failure).

Figure 1:
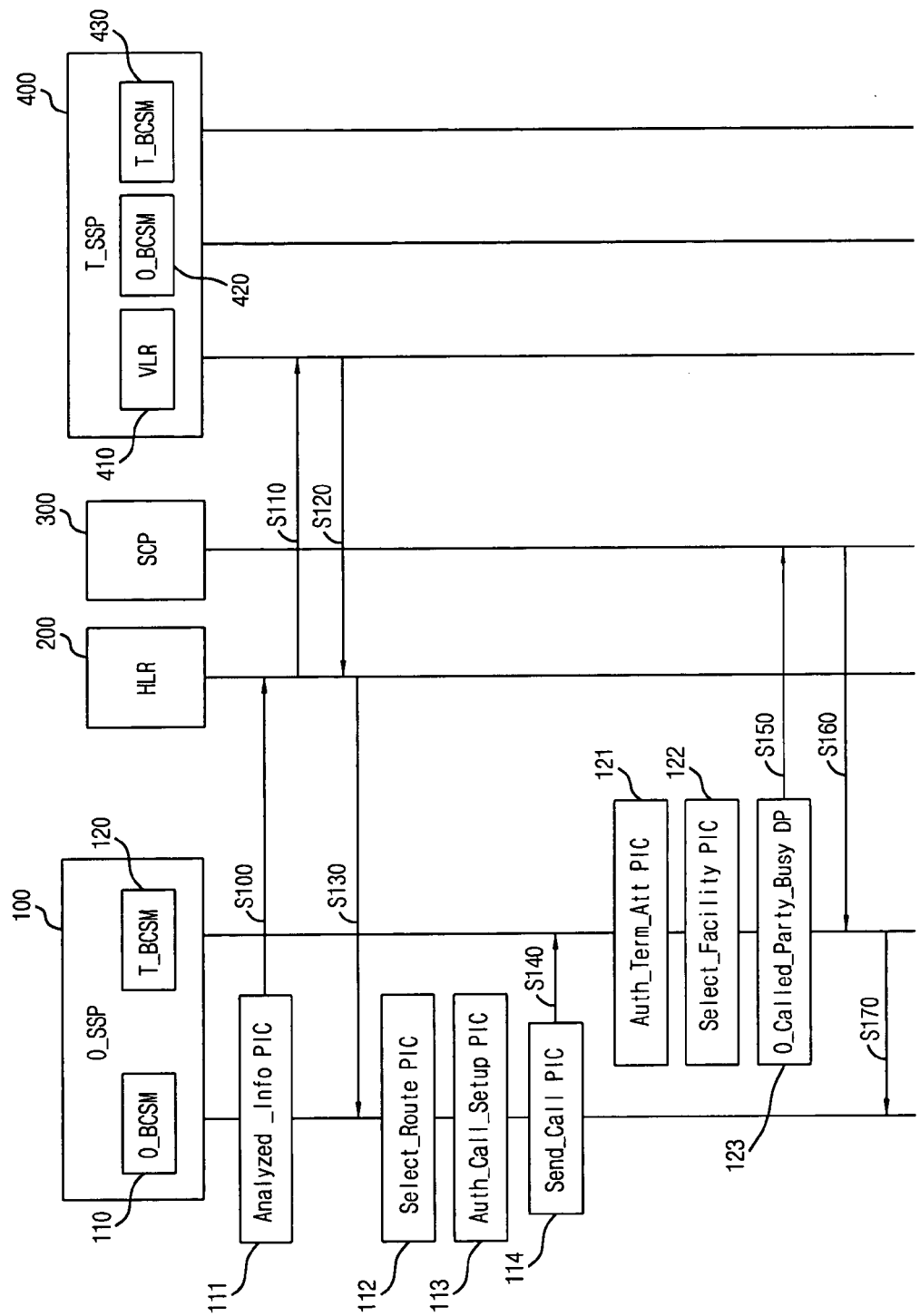
FIG. 1 is a flow chart of signal process showing an intelligent network system for processing a call of a termination BUSY state when a terminal is in termination BUSY states (busy, power down, and paging failure) according to the conventional art.

Processes of perceiving an origin of mobile terminal by an Analyzed_Info PIC 111 and translating a call to a Send_Call PIC 114 are same as those in FIG. 1, and therefore views and descriptions for that are emitted in FIG. 4. However, unlike the conventional art, an HLR (Home Location Register) 200 transmits location information carrying information for the termination BUSY state of a mobile terminal on a terminated side and an O_Busy, an O_No_Page_Response, and an O_Unroutable triggers for processing the termination BUSY state to an O_BCSM 110 in an O_SSP 100. The Send_Call PIC 114 of the O_BCSM 110 in the O_SSP 100 detects the termination BUSY state of the mobile terminal on terminated side, and the call is translated to the O_Called_Party DP 115.

The O_Called_Party DP 115 detects the triggers in order of priority, and the O_Busy, the O_No_Page_Response, and the O_Unroutable are armed on the O_Called_Party DP 115 which is one of the DPs of the O_BCSM 110 in the O_SSP 100. The O_Busy, O_No_Page_Response, and O_Unroutable triggers have trigger detect priority on the O_Called_Party DP 115. Especially, the OBUSY operation performed by the O_Busy trigger uses a same parameter of a message and a same tag value as those of the TBUSY operation for the T_Busy trigger in the conventional art, and therefore the interfaces between the other networks which are communicated with the SSP can be maintained.

The O_Called_Party DP 115 which detected the O_Busy trigger notifies the SCP 300 of the termination BUSY state of the mobile terminal on the terminated side (S400), and performs the OBUSY operation with the SCP 300 which received the termination BUSY state signal of the mobile terminal on the terminated side (S410). As a result of the OBUSY operation, the O_BCSM 420 and the T_BCSM 430 in the T_SSP 400 and the T_BCSM 120 in the O_SSP 100 are released, and a new O_BCSM 110 is generated in the O_SSP 100. The generated O_BCSM 110 in the O_SSP 100 receives a termination switch number, and translates the call to a Resume_PIC 116 which sets the PIC so that the call is translated to a Collect_Info PIC or to an Analyzed_Info PIC. The Resume PIC 116 sets the Analyzed Info PIC 111, and the O_BCSM 110 in the O_SSP 100 receives the termination switch number and then checks whether or not an automatic termination switch is set. If the automatic termination switch is set, the terminal re-attempts to call connect. However, if the automatic termination switch is not set, the terminal disconnects the call connect.

As described above, the OBUSY operation is performed by the O_Busy trigger detected on the O_Called_Party DP 115, and the termination BUSY state is processed in the O_BCSM 110, whereby only two call processors (O_BCSM5 T_BCSM) are generated until the terminal subscribed to the mobile communication is terminated to the termination switched number.

Figure 5:
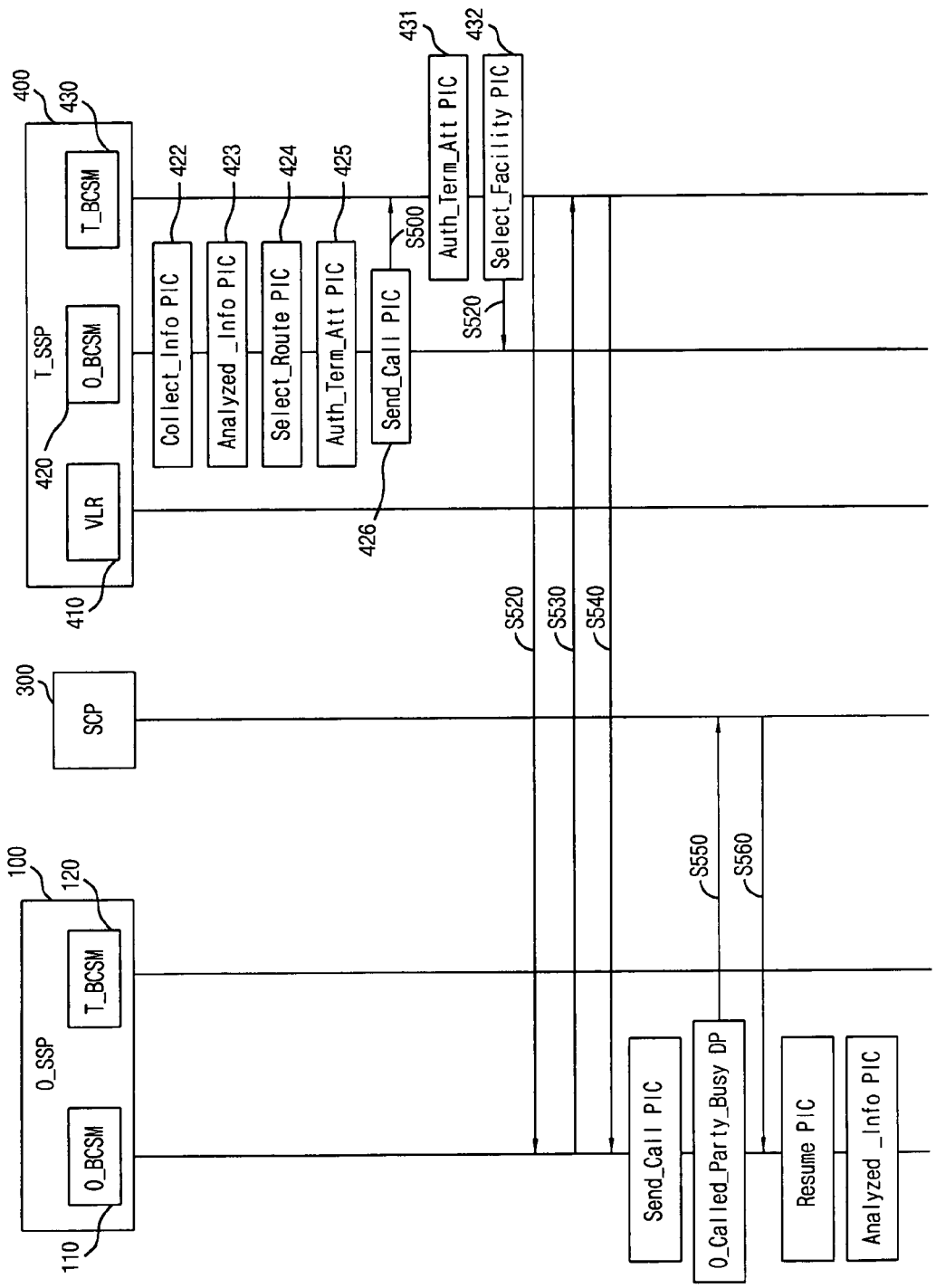
FIG. 5 is a flow chart of signal process showing the radio intelligent network system for processing a call in a termination BUSY state in case that an OBUSY operation can be performed in an O_SSP when a terminal is in a pause state according to the present invention.
Figure 6:
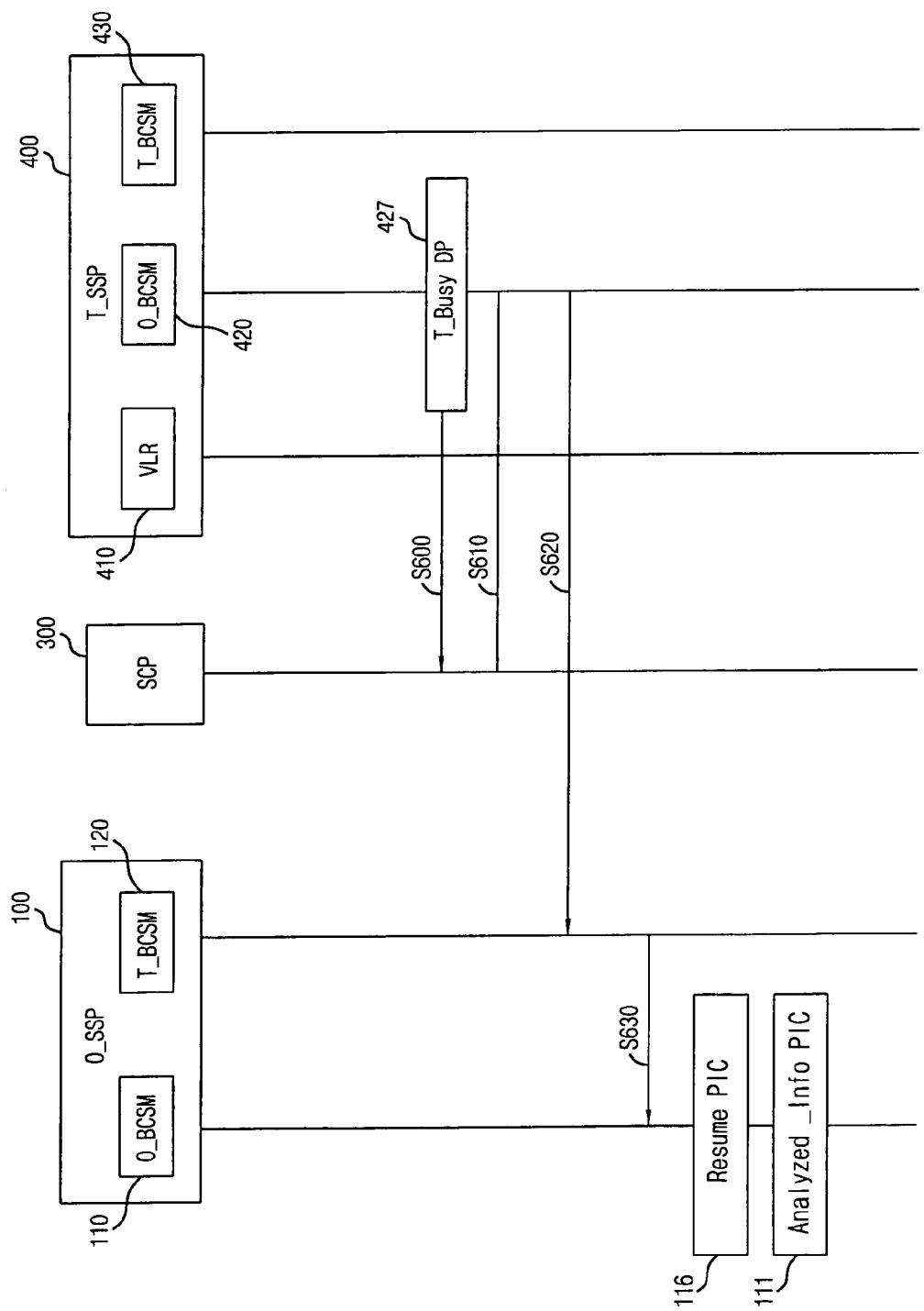
FIG. 6 is a flow chart of signal process showing the radio intelligent network system for processing a call in the termination BUSY state in case that the OBUSY operation can not be performed in the O_SSP when the terminal is in the pause state according to the present invention.

FIGS. 5 and 6 are flow charts of a signal process showing the radio intelligent network system for processing a call in the termination BUSY state when the mobile terminal on the terminated side is in the termination BUSY state when the terminal is in pause state according to the present invention.

FIG. 5 is showing the radio intelligent network system for processing a call in the termination BUSY state of the mobile terminal on a terminated side when the OBUSY operation can be performed in the O_SSP 100 according to the present invention.

Figure 2:
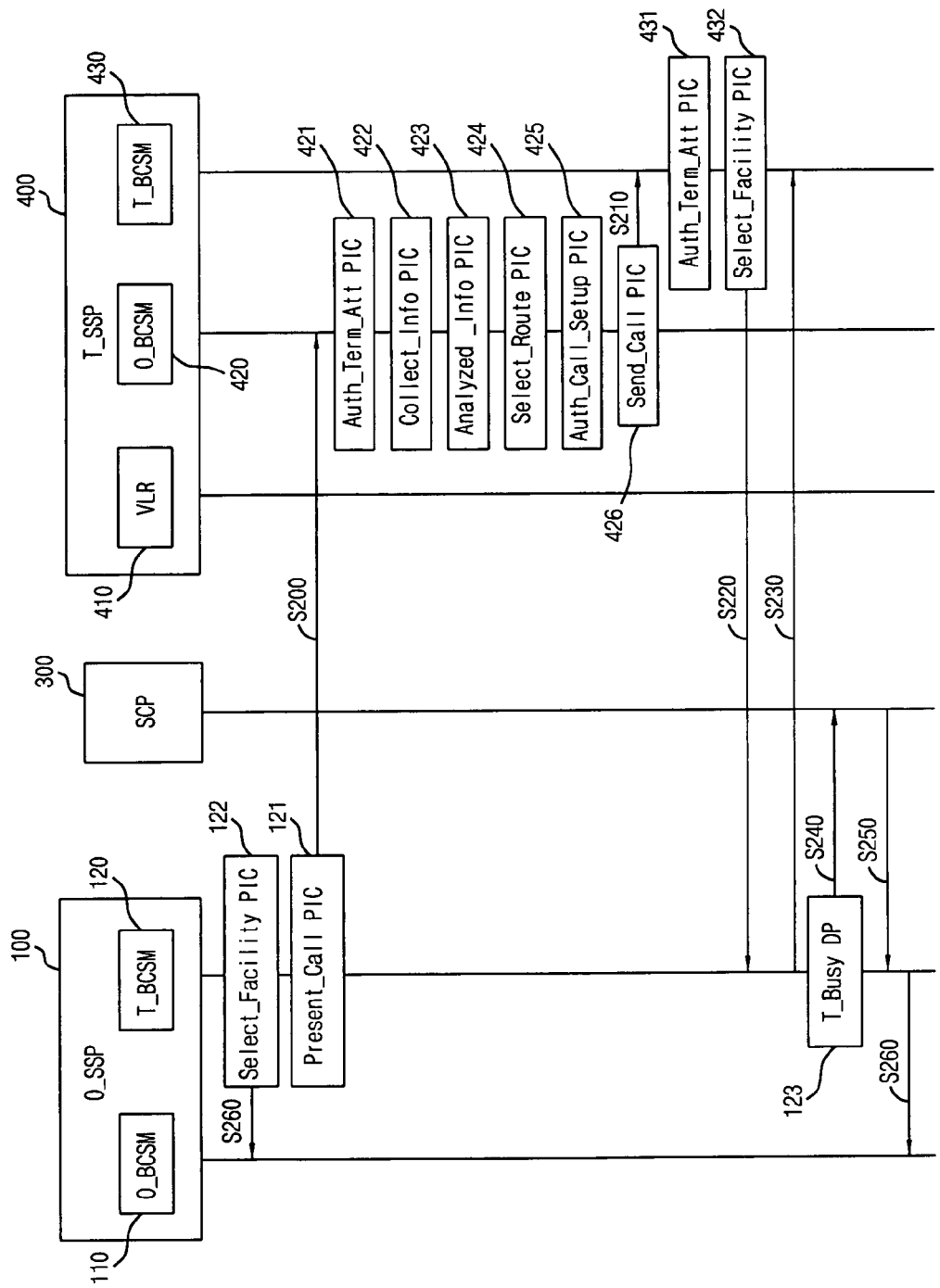
FIG. 2 is a flow chart of signal process showing the intelligent network system for processing a call of a termination BUSY state in case that a TBUSY operation can be performed in an O_SSP when the terminal is in a pause state according to the conventional art.
Figure 3:
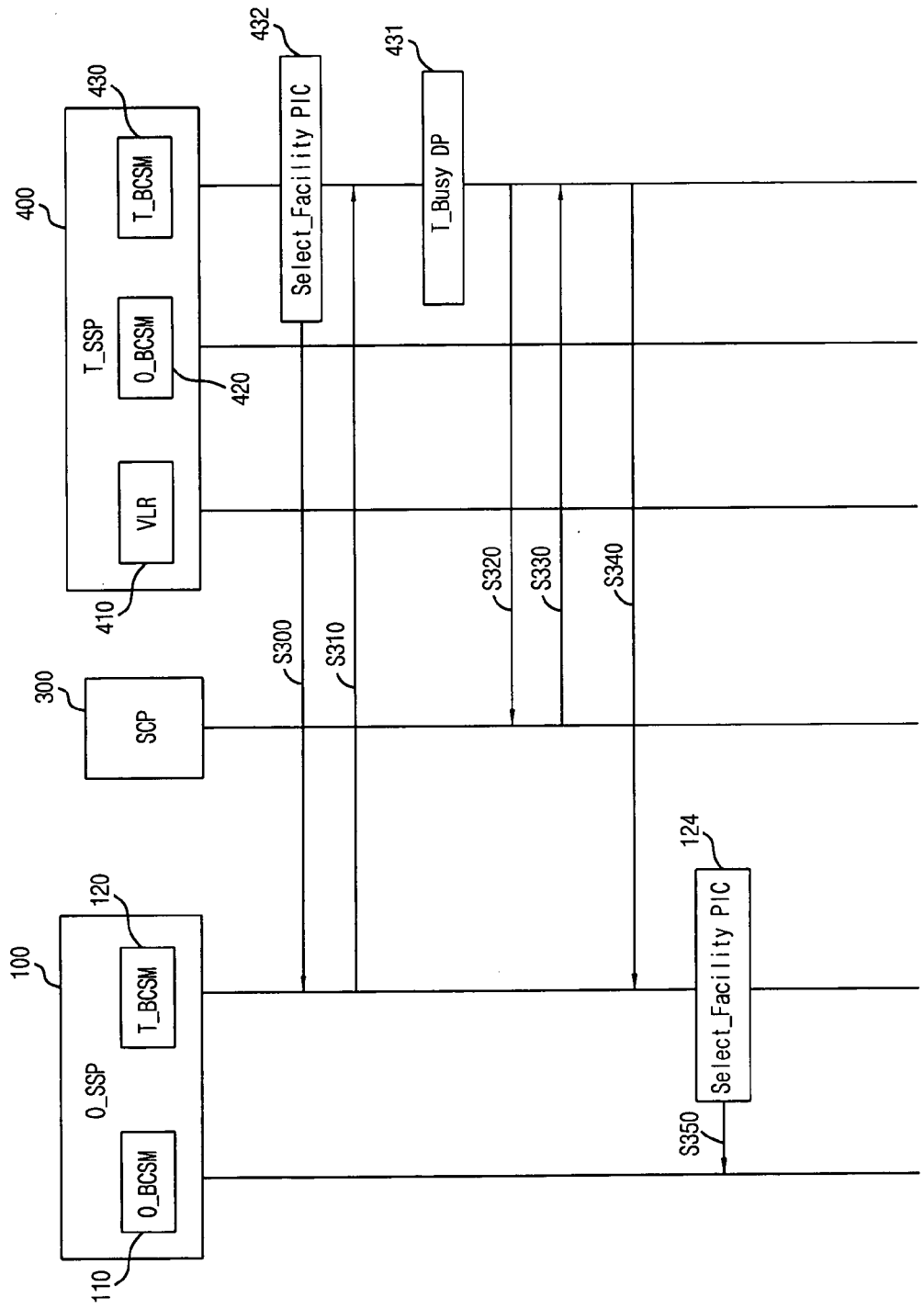
FIG. 3 is a flow chart of signal process showing the intelligent network system for processing a call of a termination BUSY state in case that the TBUSY operation can not be performed in the O_SSP when the terminal is in the pause state according to the conventional art.

The processes of perceiving a termination pause state by the mobile terminal on the terminated side and translating the call to the O_BCSM 420 in the T_SSP 400 are same as those in FIG. 2, and therefore the views and descriptions for that are omitted in FIG. 5.

The PIC on the O_BCSM 420 in the T_SSP 400 is translated to a Collect_Info PIC 422, an Analyzed_Info PIC 423, a Select_Route PIC 424, an Auth_CallSet_up PIC 425, and to a Send_Call PIC 426 in order. A T_BCSM 430 in the T_SSP 400 is generated on the Send_Call PIC 426 (S500). The T_BCSM 430 in the T_SSP 400 is translated from an Auth_Term_Att PIC 431 to a Select_Facility PIC 432. When the Select_Facility PIC 432 detects the termination BUSY state of the mobile terminal on the terminated side and notifies the O_BCSM 420 in the T_SSP 400 the O_BCSM 420 in the T_SSP 400 transmits a REDREQ to the O_BCSM 110 in the O_SSP 100 (S520). Then the O_BCSM 110 in the O_SSP 100 transmits a response signal for the REDREQ to the O_BCSM 420 in the T_SSP 400 (S530). The O_BCSM 420 in the T_SSP 400 which received the REDREQ transmits a response signal, which represents that the OBUSY operation can be performed in the O_SSP 100, to the O_BCSM 110 in the O_SSP 100 (S540). The O_BCSM 110 in the O_SSP 100 which received the response signal translates the call from the Send_Call PIC 114 to the O_Called_Party DP 115. The O_Called_Party DP 115 detects the termination BUSY state of the mobile terminal on the terminated side, and notifies the SCP 300 (S550). The O_BCSM 120 in the O_SSP 100 performs the OBUSY operation with the SCP 300 which received the termination BUSY signal of the mobile terminal on the terminated side. As a result of the operation, the O_BCSM 420 and the T_BCSM 430 in the T_SSP 400 and the T_BCSM 120 in the O_SSP 100 are released, and a new O_BCSM 110 is generated in the O_SSP 100 (S560). The generated O_BCSM 110 in the O_SSP 100 receives the termination switch number (S410), and translates the call to the Resume PIC 116 which sets the PIC so that the call is translated to the Collect_Info PIC or to the Analyzed_Info PIC. The Resume PIC 116 appoints the Analyzed_Info PIC 111, and the O_BCSM 110 in the O_SSP 100 receives the termination switch number and checks whether or not an automatic termination change is set. If the automatic termination switch is set, the terminal re-attempts the call connect. However, if the automatic termination switch is not set, the terminal disconnects the call connect.

FIG. 6 is showing the radio intelligent network system for processing the call in termination BUSY state in case that the OBUSY operation can not be performed in the O_SSP 100 according to the present invention.

The processes of identifying the termination pause state of the mobile terminal on the terminated side when a call connect is attempted and translating the call to the Select_Facility PIC 432 of the T_BCSM 430 in the T_SSP 400 are same as those in FIG. 5, and therefore view and descriptions for that are omitted.

If the O_BCSM 430 in the T_SSP 400 can not receive the REDREQ from the O_BCSM 110 in the O_SSP 100, the O_BCSM 430 transmits a signal which presents that the OBUSY operation can not be performed to the O_BCSM 110 in the O_SSP 100, and then the call is translated to a T_Busy DP 433 in the T_SSP.

The T_Busy DP 433 notifies the HLR 300 of the termination BUSY state of the mobile terminal on terminated side (S600), and performs the OBUSY operation with the HLR 300 which received the termination BUSY signal of the termination mobile terminal (S610). Consequently, the O_BCSM 420 and the T_BCSM 430 in the T_SSP 400 and the T_BCSM 120 in the O_SSP 100 are disappeared, and a new O_BCSM 110 is generated in the O_SSP 100 (S620 and S630). The generated O_BCSM 110 in the O_SSP 100 receives the termination switch number (S410), and the call is translated to the Resume PIC 116 which appoints the PIC so that the call is translated to the Collect_Information PIC or to the Analyzed_Info PIC. The Resume PIC 116 appoints the Analyzed_Info PIC 111, and the O_BCSM 120 in the O_SSP 100 receives the termination switch number, and after that checks whether or not an automatic termination switch is set. If the automatic termination switch is set, the terminal re-attempts the call connect. However, if the automatic termination switch is not set, the terminal disconnects the call connect.

The present invention releases the resources of the trunk and terminating exchanger (not shown) so that the initial originating BCSM processes the termination BUSY state by the characteristics of the mobile network which detects the termination BUSY state by receiving the REDREQ.

As described above, when the T_Busy DP detects the termination BUSY states (busy, power down, and paging failure) and the termination pause state in the radio intelligent network system, the radio intelligent network system reduces the call processes which are generated in order to process the termination BUSY states (busy, power down, and paging failure) and the termination pause state, whereby the resources such as processors, switches, and trunk in the SSP is not wasted and the call processes can be reduced.

Also, impacts on call processes can be prevented when conventional non-intelligent network is changed into the intelligent network.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A call processing method during a termination BUSY state of a terminal in an intelligent network system comprising:
   detecting a termination BUSY state of a terminal from an HLR (Home Location Register);
   directly performing an origin BUSY (OBUSY) operation between an SCP (Service Control Point) and a T_Busy DP of an origin SSP (Service Switching Point), after the termination BUSY state is detected without generating a T_BCSM in the origin SSP;
   generating an O_BCSM as a result of the OBUSY operation; and
   re-attempting a call connect to a termination switch number which is transmitted to the O_BCSM.

2. The method of claim 1, wherein performing the OBUSY operation comprises:
   receiving termination BUSY state information and trigger information from the HLR when the termination BUSY state is detected; and
   performing the OBUSY operation between the SCP which received the trigger information and the T_Busy DP of the O_SSP.

3. The method of claim 1, wherein re-attempting the call connect comprises:
   receiving the termination switch number to the generated O_BCSM;
   moving a PIC (Point in Call) to a Resume PIC after the termination switch number is received;
   checking whether or not an automatic termination switch is set in the O_BCSM after moving the PIC; and
   re-attempting the call connect to the termination switch number which is transmitted to the O_BCSM if the automatic termination switch is set.

4. The method of claim 3, further comprising:
   translating the PIC to the Resume PIC, and to an Analyzed_Info PIC.

5. The method of claim 4, wherein the Resume PIC appoints the Analyzed_Info PIC in order to call again to the termination switch number.

6. The method of claim 1, wherein the HLR transmits location information signal, the termination BUSY state information, and the trigger information to the O_SSP.

7. The method of claim 2, wherein the trigger information comprises an O_Busy trigger which represents the busy state of an origin subscriber, an O_No_Page_Response trigger which represents a state that a paging is attempted when the origin subscriber is in a pause state but a response signal is not transmitted, and an O_Unroutable trigger which represents a state that the termination can not be made because of failure of termination occurs during call connecting.

8. The method of claim 3, wherein receiving the termination switch number comprises:
   detecting the trigger information on the T_BUSY DP;
   transmitting the termination BUSY state signal of the mobile terminal on the terminated side from the T_Busy DP of the O_SSP to the SCP when the trigger information is detected; and
   receiving the termination switch number by the OBUSY operation between the SCP which received the termination BUSY state signal and the T_Busy DP.

9. The method of claim 1, wherein the $T_{13}$ Busy DP detects the trigger information in order of priority.

10. The method of claim 1, wherein an originating BCSM (O_BCSM: Origin Basic Call State Model) and a terminating BCSM (T_BCSM) in a T_SSP and a T_BCSM in the O_SSP are released.

11. The method of claim 1, further comprising:
generating a new O_BCSM in the O_SSP as a result of the OBUSY operation.

12. The method of claim 11, wherein the O_SSP receives the termination switch number from the SCP as a result of the OBUSY operation.

13. The method of claim 3, wherein the terminal disconnects the call connect if the automatic termination switch is not set.

14. A call processing method during a termination BUSY state of a terminal in a radio intelligent network system comprising:
detecting a termination pause state of a terminal from an HLR (Home Location Register);
checking whether there is a REDREQ (Redirect Request) transmitted from a T_BCSM (Terminating Basic Call State Model) in a T_SSP (Termination Service Switching Point), when the termination pause state is detected;
generating an O_BCSM in an O_SSP (Originating SSP) to process the termination BUSY state if there is the REDREQ, and receiving a termination switch number in the generated O_BCSM
directly notifying an SCP (Service Control Point) of the termination pause state without generating a corresponding T_BCSM in the O_SSP;
checking whether or not an automatic termination switch is set in the O_BCSM (Originating Basic Call State Model); and
re-attempting the call connect if the automatic termination switch is set.

15. The method of claim 14, wherein the terminal disconnects the call connect if the automatic termination switch is not set.

16. The method of claim 14 further comprising:
re-checking whether there is the REDREQ;
generating the T_BCSM from a Send_Call PIC;
receiving the REDREQ from the T_BCSM which received the termination BUSY state information of the mobile terminal on a terminated side from a Select_Facility PIC; and
re-checking whether there is the REDREQ.

17. The method of claim 14, wherein receiving the termination switch number comprises:
receiving a signal which represent that the OBUSY operation can be performed from the T_SSP which received the REDREQ; and
receiving the termination switch number by the OBUSY operation between the SCP which received the above signal and the T_Busy DP of the O_SSP.

18. The method of claim 16, wherein the T_SSP transmits a signal, which represents that the OBUSY operation can be performed, to the O_SSP after the REDREQ is transmitted from the O_SSP.

19. The method of claim 14, wherein re-attempting the call connect comprises:
translating the PIC to a Resume PIC;
translating the PIC to an Analyzed_Info PIC set by the Resume PIC after the translation to the Resume PIC; and
calling again to the termination switch number transmitted from the SCP after the translation to the Analyzed_Info PIC and the OBUSY operation is performed.

20. The method of claim 19, wherein the Resume PIC appoints the Analyzed_Info PIC in order to call again to the termination switch number.

21. The method of claim 14, further comprising:
receiving the termination switch number by the OBUSY operation between the SCP, which received the terminating BUSY state information from the T_Busy DP of the T_SSP, and the T_Busy DP of the SSP after a signal which represents that the OBUSY operation can not be performed is transmitted from the T_SSP which did not receive the REDREQ, if there is not the REDREQ; and
trying to call again to the transmitted termination switch number.

22. A method of processing a termination state of a called terminal, comprising:
detecting the termination state of the called terminal;
generating an Originating Basic Call State Model (O_BCSM) in an Originating Service Switching Point (O_SSP) associated with a calling terminal when the termination state is detected;
transferring a termination state and trigger information for processing the termination state of the called terminal from a Home Location Register (HLR) to the O_BCSM; and
notifying from the O_BCSM to a Service Control Point (SCP) associated with the calling terminal and the called terminal without generating a Terminating BCSM (T_BCSM) in the O_SSP the termination state of the called terminal using the transferred termination state and trigger information.

23. The method of claim 22, wherein the termination state comprises a busy termination state or a pause termination state.

24. The method of claim 22, further comprising:
re-attempting to call connect with the called terminal.

25. The method of claim 25, wherein re-attempting to call connect comprises:
receiving the termination switch number to the generated O_BCSM;
moving a PIC (Point in Call) to a Resume PIC after the termination switch number is received;
checking whether or not an automatic termination switch is set in the O_BCSM after moving the PIC; and
re-attempting the call connect to the termination switch number which is transmitted to the O_BCSM if the automatic termination switch is set.

26. The method of claim 22, wherein the trigger information comprises an O_Busy trigger which represents the busy state of an origin subscriber, an O_No_Page_Response trigger which represents a state that a paging is attempted when the origin subscriber is in a pause state but a response signal is not transmitted, and an O_Unroutable trigger which represents a state that the termination can not be made because of failure of termination occurs during call connecting.

* * * * *